(12) United States Patent
Lee et al.

(10) Patent No.: US 7,927,758 B2
(45) Date of Patent: Apr. 19, 2011

(54) GASKET BEING CAPABLE OF MEASURING VOLTAGE AND FUEL CELL SYSTEM HAVING THE SAME

(75) Inventors: Dong Uk Lee, Ulsan (KR); Jin Hong An, Ulsan (KR); Seong Jin An, Ulsan (KR); Yeong Chan Eun, Ulsan (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1126 days.

(21) Appl. No.: 11/651,830

(22) Filed: Jan. 8, 2007

(65) Prior Publication Data

US 2007/0160882 A1 Jul. 12, 2007

(30) Foreign Application Priority Data

Jan. 11, 2006 (KR) .................. 10-2006-0003310
Jan. 4, 2007 (KR) .................. 10-2007-0001119

(51) Int. Cl.
*H01M 2/08* (2006.01)
*H01M 8/10* (2006.01)

(52) U.S. Cl. .................. 429/508; 429/490; 429/479

(58) Field of Classification Search .................. None
See application file for complete search history.

(56) References Cited

U.S. PATENT DOCUMENTS

| | | | |
|---|---|---|---|
| 6,740,443 B2 * | 5/2004 | Yamazaki et al. | 429/38 |
| 2003/0013000 A1 * | 1/2003 | Kuroki | 429/35 |
| 2005/0191537 A1 | 9/2005 | Belchuk | |
| 2007/0065707 A1 | 3/2007 | Zerfass et al. | |

FOREIGN PATENT DOCUMENTS

| | | |
|---|---|---|
| EP | 1 296 395 A1 | 3/2003 |
| EP | 1 768 204 A2 | 3/2007 |
| FR | 2 871 944 | 12/2005 |

(Continued)

OTHER PUBLICATIONS

Japanese Office action dated Nov. 17, 2009, for corresponding Japanese application 2006-180214, noting listed reference in this IDS.

(Continued)

*Primary Examiner* — Dah-Wei D Yuan
*Assistant Examiner* — Maria J Laios
(74) *Attorney, Agent, or Firm* — Christie, Parker & Hale, LLP

(57) ABSTRACT

A fuel cell system having an electricity generator that generates electricity by the electrochemical reaction between hydrogen and oxygen. The electricity generator includes a membrane electrode assembly with a conductive polymer membrane, and anode and cathode electrode layers on opposite sides of the conductive polymer membrane. The electricity generator has a pair of separator plates facing the anode and cathode electrode layers of the membrane electrode assembly and having channels through which flow hydrogen containing fuel or oxygen containing gas. There is also a pair of gaskets provided on opposite sides of the ionic conductive polymer to enclose each edge of the anode and cathode electrodes so that fluid leakage is prevented between the ionic conductive polymer membrane and the separator plates, wherein at least one of the gaskets is used as a voltage measuring gasket including a nonconductive first frame and a conductive second frame. The voltage measuring gasket having the conductive frame is used for measuring the voltage of the unit cell, thereby preventing a bipolar plate from being damaged.

13 Claims, 2 Drawing Sheets

FOREIGN PATENT DOCUMENTS

| | | |
|---|---|---|
| JP | 6-267578 | 9/1994 |
| JP | 7-282832 | 10/1995 |
| JP | 8-7911 | 1/1996 |
| JP | 9-199147 | 7/1997 |
| JP | 2003-123801 | 4/2003 |
| JP | 2005-19042 | 1/2005 |
| JP | 2005-093394 | 4/2005 |
| JP | 2005-183308 | 7/2005 |
| WO | WO 02/01659 A1 | 1/2002 |
| WO | WO 2006/003332 A1 | 1/2006 |

OTHER PUBLICATIONS

Patent Abstracts of Japan, Publication No. 08-007911; Publication Date: Jan. 12, 1996; in the name of Hirai et al.

Patent Abstracts of Japan, Publication No. 09-199147; Publication Date: Jul. 31, 1997; in the name of Yajima et al.

Patent Abstracts of Japan, Publication No. 2003-123801; Publication Date: Apr. 25, 2003; in the name of Kobayashi et al.

Patent Abstracts of Japan, Publication No. 2005-019042; Publication Date: Jan. 20, 2005; in the name of Takebe et al.

Patent Abstracts of Japan, Publication No. 2005-183308; Publication Date: Jul. 7, 2005; in the name of Fujii et al.

Patent Abstracts of Japan, Publication No. 06-267578; Date of Publication: Sep. 22, 1994; in the name of Tadahiko Taniguchi.

Patent Abstracts of Japan, Publication No. 07-282832; Date of Publication: Oct. 27, 1995; in the name of Nariyuki Kawazu.

Search Report dated May 18, 2007 for European Patent Application No. 07100382.6-2119.

Japanese Office action dated Sep. 7, 2010, for corresponding Japanese Patent application 2006-180214, noting listed reference in this IDS, as well as U.S. Publication 2005/0191537, previously filed in an IDS dated Aug. 6, 2007, and International Publication WO 02/001659, previously filed in an IDS dated Jan. 7, 2010.

* cited by examiner

GASKET BEING CAPABLE OF MEASURING VOLTAGE AND FUEL CELL SYSTEM HAVING THE SAME

CROSS-REFERENCE TO RELATED APPLICATIONS

This application claims priority to and the benefit of Korean Patent Application Nos. 2006-3310 and 2007-1119, filed on Jan. 11, 2006 and Jan. 4, 2007, in the Korean Intellectual Property Office, the disclosures of which are incorporated herein by references.

BACKGROUND

1. Field of the Invention

The present invention relates to a voltage measuring means for measuring voltage of an electricity generator in the developing, optimization-tuning, or operation processes of a fuel cell.

2. Discussion of Related Art

In general, a fuel cell system is an electric generating system that includes an electric generator to generate electricity by electrochemical reaction between hydrogen and oxygen. The electric generator has a stacked structure including a plurality of unit cells, each of which has an ionic conductive polymer membrane having selective ion permeability, and cathode and anode electrodes provided on opposite sides of the polymer membrane. Further, bipolar plates are provided between adjacent unit cells and supply hydrogen and oxygen to the anode and cathode electrodes, respectively. There are conventional means for measuring the voltage of the electric generator where the electricity is generated by the electrochemical reaction between hydrogen and oxygen.

One conventional technology used to measure the voltage of the fuel unit cell, is the method of inserting a probe such as a pin into a bipolar plate of a unit cell. This method does not assure secure stable contact, so that it is difficult to correctly measure the voltage. Further, as the number of attempts to measure the voltage in the developing or the tuning processes increases, the bipolar plate of the unit cell may be damaged by the contact.

SUMMARY OF THE INVENTION

Accordingly, one embodiment of the present invention provides a fuel cell system with a gasket having a voltage measuring terminal to measure the voltage of an electricity generator while preventing the electricity generator from leaking fluid.

Another embodiment of the present invention provides a fuel cell system having an electricity generator that generates electricity by an electrochemical reaction between hydrogen containing fuel and oxygen containing gas in an anode electrode and a cathode electrode, the electricity generator including a membrane electrode assembly with an ionic conductive polymer membrane on opposite sides of which the anode and cathode electrodes are provided. Also included are a pair of separator plates facing the anode and cathode electrodes of the membrane electrode assembly and having channels through which flow hydrogen containing fuel or oxygen containing gas to be supplied to the electrodes. A pair of gaskets provided on opposite sides of the ionic conductive polymer to enclose each edge of the anode and cathode electrodes so that fluid leakage is prevented between the ionic conductive polymer membrane and the separator plates, and at least one of the gaskets is used as a voltage measuring gasket including a nonconductive first frame and a conductive second frame.

According to an embodiment of the invention, the voltage measuring gasket includes a voltage measuring terminal.

According to an embodiment of the invention, the second frame contacts the ionic conductive polymer membrane, and the first frame contacts the separator plate.

According to an embodiment of the invention, the second frame is provided with the voltage measuring terminal.

According to an embodiment of the invention, the first and second frames include an opening and a rim surrounding the opening and the opening allows the electrode provided on one side of the ionic conductive polymer membrane to be in contact with the surface of the fuel supplying channel of the separator plate.

According to an embodiment of the invention, the rim is formed to enclose each edge of the anode and cathode electrodes.

Further embodiment of the invention provides a gasket for a fuel cell comprising a nonconductive first frame and a conductive second frame. The gasket is used as a voltage measuring gasket.

According to an embodiment of the invention, the gasket further comprises a voltage measuring terminal provided in the second frame.

BRIEF DESCRIPTION OF THE DRAWINGS

These and/or other embodiments of the invention will become apparent and more readily appreciated from the following description of exemplary embodiments, taken in conjunction with the accompanying drawings of which.

DETAILED DESCRIPTION OF EXEMPLARY EMBODIMENTS

Hereinafter, several embodiments according to the present invention will be described with reference to the accompanying drawings.

Figure 1:
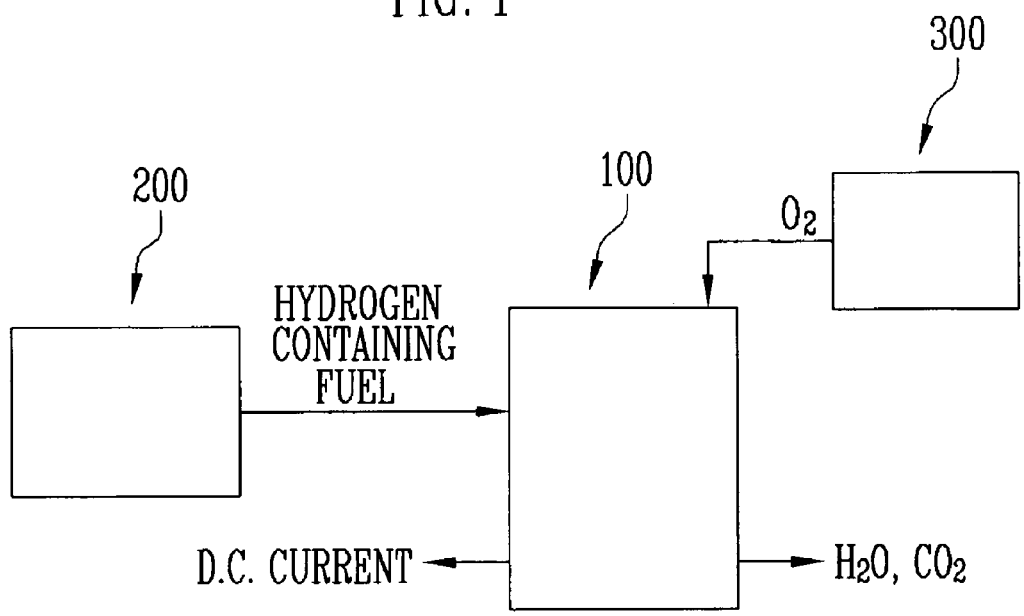
FIG. 1 is a schematic view of a fuel cell system according to an embodiment of the present invention.

Referring to FIG. 1, a fuel cell system according to an embodiment of the present invention includes at least one unit cell comprising an electricity generator 100 to generate electricity by the electrochemical reaction between hydrogen and oxygen; a fuel feeder 200 supplying hydrogen containing fuel to the electricity generator 100; and an air feeder 300 supplying oxygen containing gas to the electricity generator 100.

In an embodiment, the hydrogen containing fuel includes an alcohol fuel such as methanol, ethanol, etc.; hydrocarbonaceous fuels such as methane, propane, butane, etc.; liquid raw fuels such as liquid natural gas or the like; or gaseous raw fuels such as hydrogen. In one embodiment, hydrogen can be obtained from the liquid raw fuel.

According to an embodiment of the invention, in a direct methanol fuel cell (DMFC) that directly supplies the liquid raw fuel to the electricity generator 100, the fuel feeder 200 can include a raw fuel feeding tank (not shown). In another embodiment, a polymer electrolyte membrane fuel cell (PEMFC) supplies the gaseous raw fuel to the electricity generator 100. The fuel feeder 200 can include a raw fuel storage (not shown) for the liquid raw fuel, and a reformer (not shown) feeding the electricity generator 100 with a reforming fuel, i.e., the gaseous raw fuel mainly containing hydrogen that is obtained by reforming the liquid raw fuel supplied from the raw fuel storage.

Hereinafter, the DMFC according to an embodiment of the invention will be described by way of an example.

Figure 2:
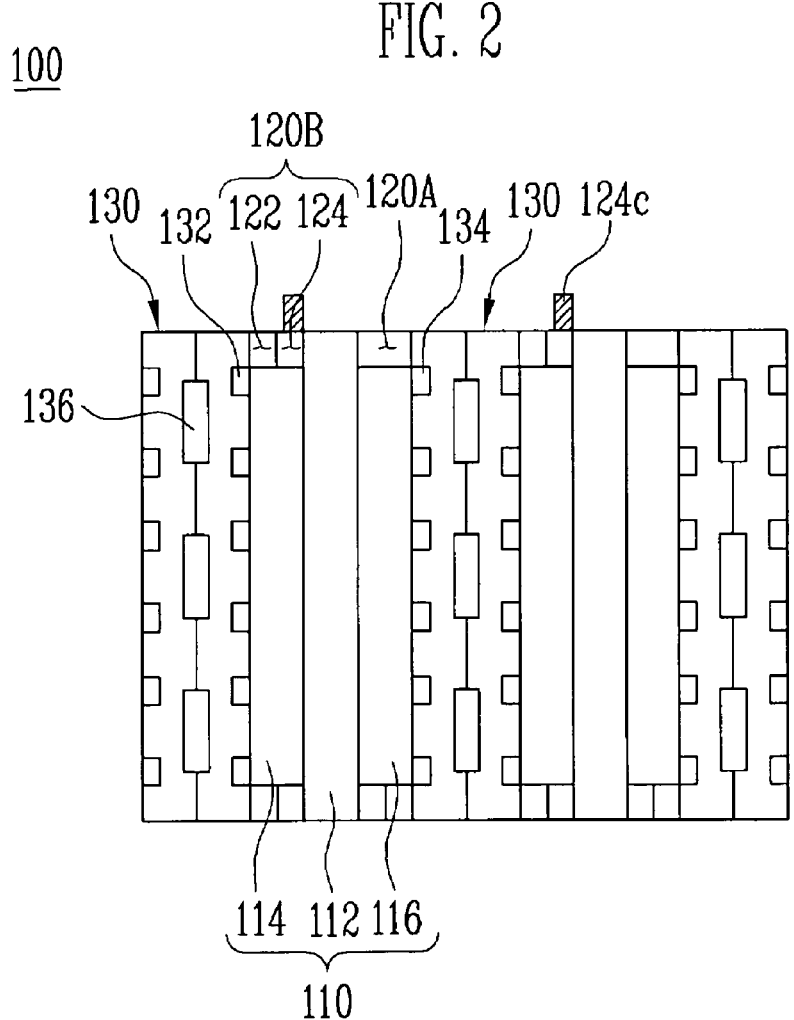
FIG. 2 is a partial sectional view of an electricity generator having a voltage measuring gasket according to an embodiment of the present invention.

Referring to FIG. 2, the unit cell of the electricity generator 100 includes a membrane electrode assembly (MEA) 110 and a separator plate 130 supplying hydrogen containing gas and oxygen containing gas to an anode electrode 114 and a cathode electrode 116, respectively. The membrane electrode assembly 110 includes an ionic conductive polymer membrane 112 having selective ion permeability, and the anode electrode 114 and the cathode electrode 116 provided on opposite sides of the ionic conductive polymer membrane 112.

In an embodiment, the ionic conductive polymer membrane 112 has an ion exchange function of supplying a hydrogen ion generated from a catalyst layer (not shown) of the anode electrode 114 to the catalyst layer of the cathode electrode 116, and a function of preventing the hydrogen containing fuel from permeating therein. In an embodiment, the ionic conductive polymer membrane 112 has a thickness in the range of about 50 μm to 200 μm. Further, in one embodiment, the ionic conductive polymer membrane 112 includes a perfluorosulfonate resin film made of a perfluorosulfonate resin (NAFION™), a film having a porous polytetrafluoro ethylene thin film support coated with perfluorinated sulfonic acid or the like resin solution, or a film having a porous nonconductive polymer support coated with positive ion exchange resin and inorganic silicate.

In the membrane electrode assembly 110 according to an embodiment, the electrode, e.g., the cathode electrode 116 includes a first porous supporting layer such as carbon paper, a first diffusion layer for a catalyst material, and a first catalyst layer which are stacked in sequence on the first porous supporting layer. The first porous supporting layer serves as both an inlet channel for oxygen, supplied through an oxygen supplying channel 134 formed in a side of the separator plate 130, and also an outlet channel for water ($H_2O$) that is a byproduct from an electrochemical reaction performed in the first catalyst layer (to be described later). In the first catalyst layer, oxygen supplied via the first porous supporting layer and the first diffusion layer is reduced by the following reaction formula (1).

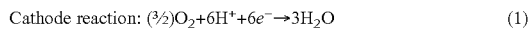

Cathode reaction: $(3/2)O_2 + 6H^+ + 6e^- \rightarrow 3H_2O$     (1)

The first diffusion layer is interposed between the first porous supporting layer and the first catalyst layer, and allows oxygen supplied from the oxygen supplying channel 134 to be uniformly diffused through the first catalyst layer, thereby discharging water, based on the reduction reaction, to the first porous supporting layer.

In one embodiment, the anode electrode 114 includes a second porous supporting layer such as carbon paper, a second diffusion layer for a catalyst material, and a second catalyst layer which are stacked in sequence on the second porous supporting layer. The second porous supporting layer serves as both an inlet channel for the hydrogen containing fuel supplied through a fuel supplying channel 132 formed in a side of the separator plate 130, and also an outlet channel for carbon dioxide ($CO_2$) that is a byproduct from an electrochemical reaction performed in the second catalyst layer (to be described later). In the second catalyst layer, the hydrogen containing fuel supplied via the second porous supporting layer and the second diffusion layer is oxidized by the following reaction formula (2).

Anode reaction: $CH_3OH + H_2O \rightarrow CO_2 + 6H^+ + 6e^-$     (2)

The second diffusion layer is interposed between the second porous supporting layer and the second catalyst layer, and allows the hydrogen containing fuel supplied from the fuel supplying channel 132 to be uniformly diffused through the second catalyst layer, thereby discharging carbon dioxide based on the oxidation reaction to the second porous supporting layer.

Thus, in the electricity generator 100, the anode electrode 114 generates carbon dioxide, six hydrogen ions, and six electrons by the reaction between methanol and water (oxidation reaction). The hydrogen ions are transferred to the cathode electrode 116 via the polymer membrane 112, for example, via a hydrogen ion exchange membrane. The cathode electrode 116 generates water by reaction among the hydrogen ions, the electrons and oxygen. The reaction between the methanol and oxygen produces water and carbon dioxide.

In the unit cell of the electricity generator 100 according to an embodiment, gaskets 120A and 120B are provided between the ionic conductive polymer membrane 112 of the membrane electrode assembly 110 and the separator plate 130. The gaskets 120A and 120B are provided to prevent the hydrogen containing fuel supplied to the anode electrode 114 through the fuel supplying channel 132 of the separator plate 130 and the oxygen supplied to the cathode electrode 116 through the oxygen supplying channel 134 of the separator plate 130 leaking through between the ionic conductive polymer membrane 112 and the separator plate 130. That is, the gasket 120A and 120B are provided to enclose each edge of the anode and cathode electrodes 114 and 116 between the ionic conductive polymer membrane 112 of the membrane electrode assembly 110 and the separator plate 130.

According to an embodiment of the present invention, at least one of the gaskets is used as a voltage measuring gasket 120B, which not only prevents fluid leakage but also measures a voltage generated in the unit cell. In the accompanying drawings, the voltage measuring gasket 120B is provided facing the anode electrode of the membrane electrode assembly 110, but is not limited thereto. Alternatively, the voltage measuring gasket may be provided facing the cathode electrode, or opposite sides of the membrane electrode assembly 110.

Figure 3:
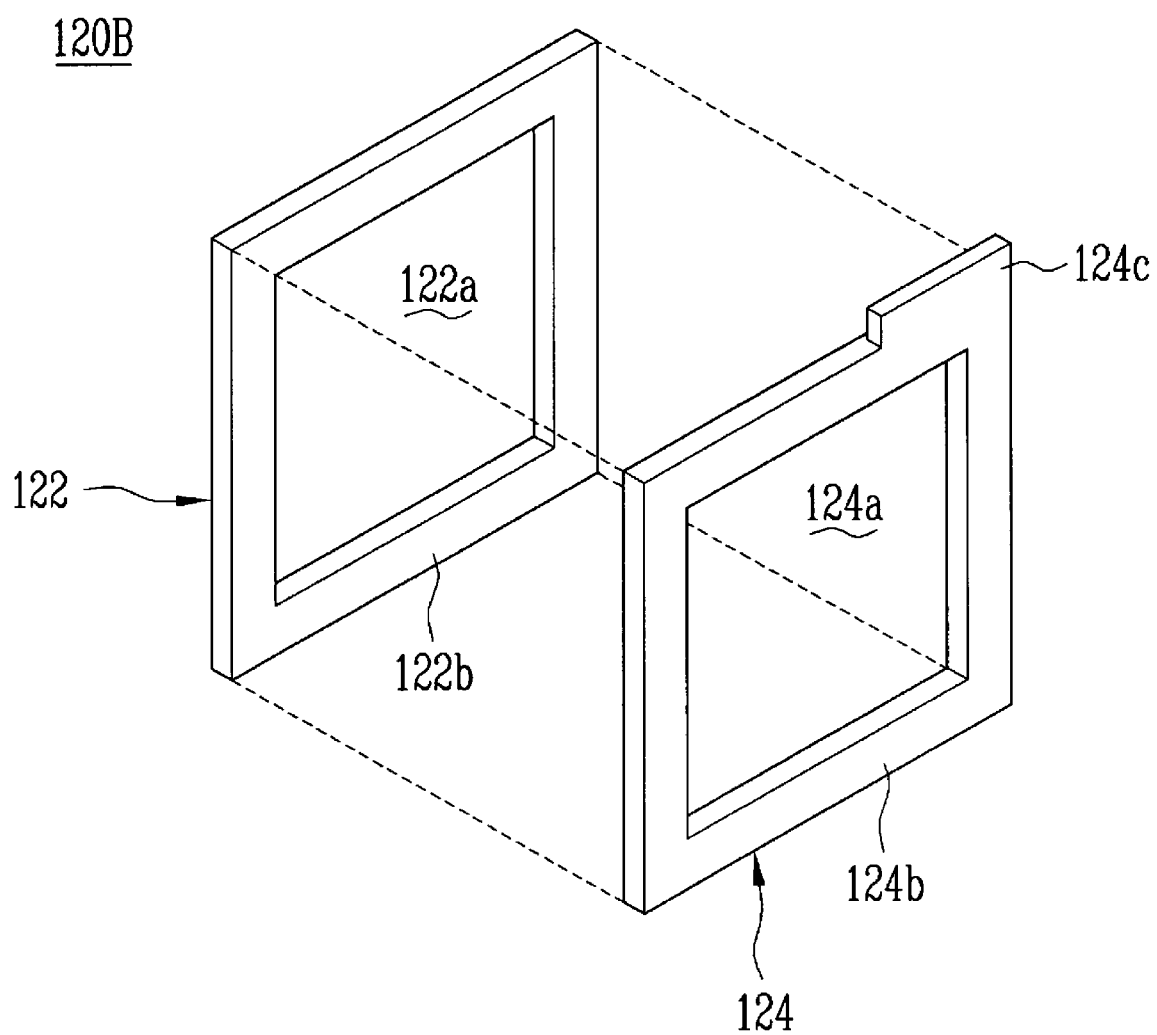
FIG. 3 is a perspective view of a voltage measuring gasket according to an embodiment of the present invention.

Referring to FIG. 3, the voltage measuring gasket 120B according to one embodiment of the invention includes a nonconductive first frame 122, and a conductive second frame 124. Where the voltage measuring gasket 120B is provided on the anode electrode, each of the first frame 122 and the second frame 124 includes an opening 122a, 124a that allows the anode electrode to be in contact with the surface of the fuel supplying channel 132 of the separator plate 130, and a rim 122b, 124b that surrounds the opening 122a, 124a. The rims 122b, 124b are preferably formed to enclose the edge of the anode electrode. The second frame 124 is provided with a voltage measuring terminal 124c outwardly extended from the rim 124b. The first frame 122 is located in a position contacting the separator plate 130, and the second frame 124 is located in a position contacting the conductive polymer membrane 112. In doing so, current based on the electrochemical reaction in the membrane electrode assembly 110 can flow to the second frame 124.

As described above, while the voltage measuring gasket 120B is provided between one side of the ionic conductive polymer membrane 112 and one separator plate, an ordinary gasket 120A is provided between the other side of the ionic conductive polymer membrane 112 and another separator plate. Alternatively, the voltage measuring gasket 120B according to the present invention may be provided on the opposite sides of the conductive polymer membrane 112.

In the separator plate 130, the fuel supplying channel 132 through which the hydrogen containing fuel flows is placed in one side of the separator plate 130 facing the anode electrode 114 of the membrane electrode assembly 100, and the oxygen supplying channel 134 through which oxygen containing gas flows is placed in the other side of the separator plate 130 facing the cathode electrode 116 of the membrane electrode assembly 100. Further, the separator plate 130 includes a refrigerant channel 136 through which a refrigerant flows to dissipate heat generated in the foregoing electrochemical reaction.

In the fuel cell system having the electricity generator with the foregoing configurations, whether it operates normally or not is determined by measuring the voltage of each unit cell during a developing, optimizing-tuning, or real operation process. In other words, a voltmeter (not shown) is connected to the voltage measuring terminal 124c provided in the second frame of the voltage measuring gasket 120B, thereby measuring the voltage of each unit cell. The voltmeter generally includes a voltage probe which is electrically connected to the voltage measuring terminal 124c, and a voltage indicator to indicate the voltage of the unit cell measured by the voltage probe.

Below, operation of the fuel cell system according to an embodiment of the present invention will be described.

The fuel feeder 200 supplies low-concentration hydrogen containing fuel, e.g., methanol diluted with water and having a predetermined concentration, to the electricity generator 100. In the electricity generator 100, the hydrogen containing fuel is readily supplied to the unit cell, particularly, to the anode electrode 114 of the membrane electrode assembly 110 through the fuel supplying channel 132 of the separator plate 130. On the other hand, the oxygen feeder 300 supplies oxygen to the electricity generator 100. In the electricity generator 100, oxygen is supplied to the unit cell, particularly, to the cathode electrode 116 of the membrane electrode assembly 110 through the oxygen supplying channel 134 of the separator plate 134.

In the anode electrode 114 according to one embodiment, the hydrogen containing fuel supplied via the second porous supporting layer and the second diffusion layer is oxidized in the second catalyst layer, thereby generating hydrogen ions, electrons and carbon dioxide. The hydrogen ion is transferred to the first catalyst layer of the cathode electrode 116 via the ionic conductive polymer membrane 112, and carbon dioxide is discharged outside through the fuel supplying channel 132 of the separator plate 130 via the second porous supporting layer.

In the cathode electrode 116, oxygen supplied via the first porous supporting layer and the first diffusion layer is reacted with the hydrogen ion in the first catalyst layer, thereby generating water. Water is discharged outside through the oxygen supplying channel 134 of the separator plate 130 via the first porous supporting layer.

In an embodiment, the voltage probe of the voltmeter is electrically connected to the voltage measuring terminal 124c, thereby measuring the voltage generated by the foregoing chemical reaction in the unit cell. Thus, the normal operation of each unit cell is determined according to levels of the voltage measured by the voltmeter.

Although several embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A fuel cell system having an electricity generator that generates electricity by electrochemical reaction between hydrogen containing fuel and oxygen containing gas in an anode electrode and a cathode electrode, the electricity generator comprising:
    a membrane electrode assembly including an ionic conductive polymer membrane, and the anode and cathode electrodes are provided on opposite sides of the ionic conductive polymer membrane;
    a pair of separator plates facing the anode and cathode electrodes of the membrane electrode assembly and having channels through which flow the hydrogen containing fuel or the oxygen containing gas to be supplied to the electrodes; and
    a pair of gaskets provided on opposite sides of the ionic conductive polymer membrane to surround respective peripheries of the anode and cathode electrodes so that fluid leakage is prevented between the ionic conductive polymer membrane and the separator plates,
    wherein at least one of the gaskets is used as a voltage measuring gasket comprising a nonconductive first frame and a conductive second frame.

2. The fuel cell system according to claim 1, wherein the voltage measuring gasket includes a voltage measuring terminal.

3. The fuel cell system according to claim 2, the voltage measuring terminal is provided in the second frame.

4. The fuel cell system according to claim 3, wherein the second frame contacts the ionic conductive polymer membrane, and the first frame contacts one of the separator plates.

5. The fuel cell system according to claim 4, wherein the first and second frames include an opening and a rim surrounding the opening and the opening allows the electrode provided on one side of the ionic conductive polymer membrane to be in contact with a surface of one of the channels through which the fuel flows of the one of the separator plates.

6. The fuel cell system according to claim 5, wherein the rim is formed to enclose an edge of the anode electrode.

7. The fuel cell system according to claim 5, wherein the rim is formed to enclose an edge of the cathode electrode.

8. The fuel cell system according to claim 1, wherein at least one of the separator plates includes a refrigerant channel through which a refrigerant flows.

9. A gasket for a fuel cell comprising:
    a nonconductive first frame and a conductive second frame wherein the gasket is used as a voltage measuring gasket.

10. The gasket of claim 9, further comprising a voltage measuring terminal.

11. The gasket of claim 10, wherein the voltage measuring terminal is provided in the second frame.

12. The fuel cell system according to claim 4, wherein the conductive second frame continuously contacts the ionic conductive polymer membrane at a periphery of the ionic conductive polymer membrane.

13. The fuel cell system according to claim 12, wherein the nonconductive first frame continuously contacts the one of the separator plates at a periphery of the one of the separator plates.

* * * * *